Jan. 13, 1953     C. VAN DEVENTER, III     2,625,447
PULLEY BEARING SEAL
Filed Feb. 12, 1947
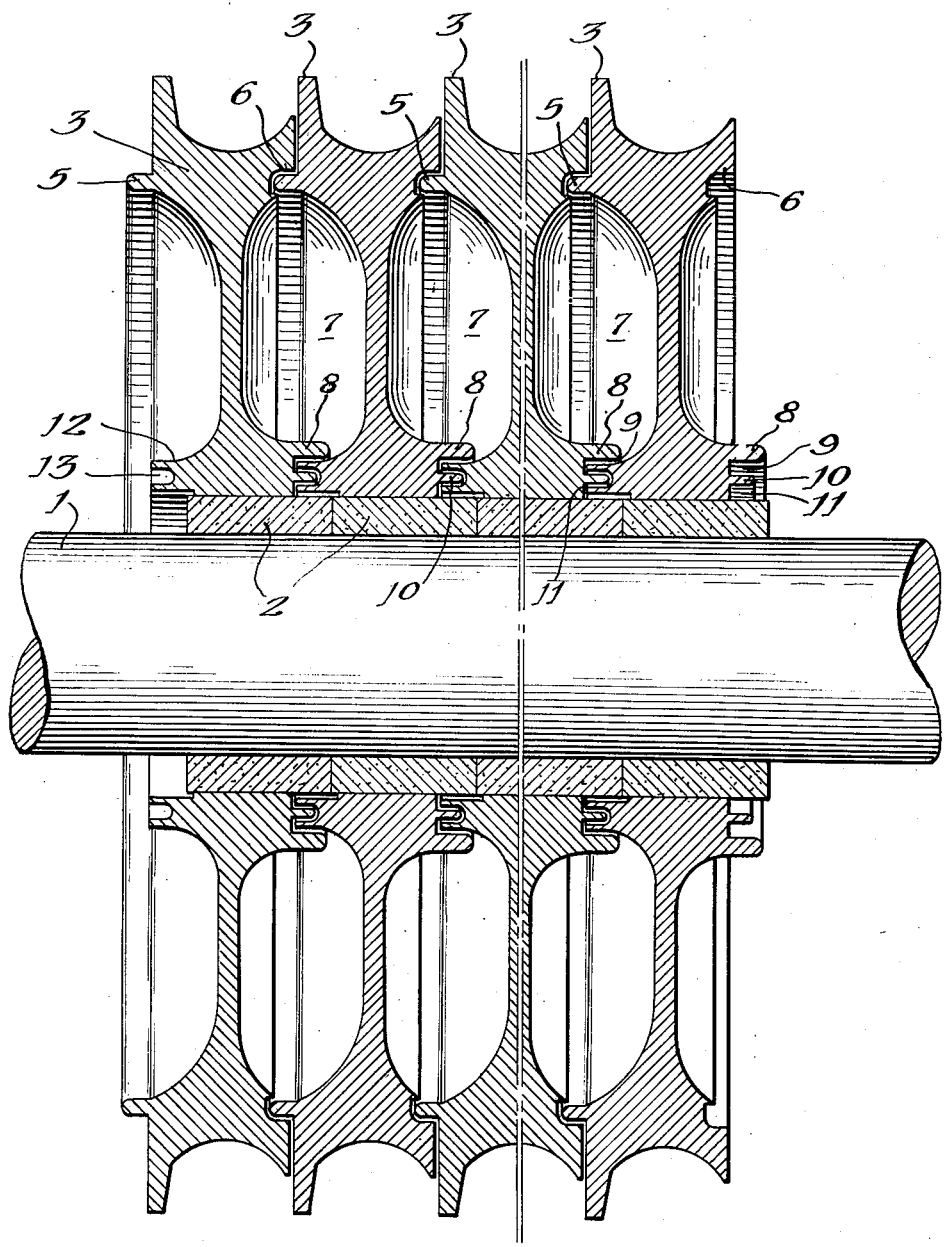
Inventor:
Christopher Van Deventer III
By: Greek Wells
Attorney.

Patented Jan. 13, 1953

2,625,447

UNITED STATES PATENT OFFICE 2,625,447

PULLEY BEARING SEAL

Christopher Van Deventer, III, Knoxville, Tenn., assignor to National Plastics, Inc., Knoxville, Tenn., a corporation of Delaware Application February 12, 1947, Serial No. 728,188

4 Claims. (Cl. 308—36.1)

The present invention relates to means for protecting bearings against lint and other foreign matter in textile machinery where a series of sheaves, idlers or other rotating elements are mounted side by side on a common shaft. In these constructions the bearings are subject to wear, and cause much difficulty due to the fact that they cannot be lubricated in the ordinary fashion, and the lint and other foreign matter getting between the bearings increases the rate of wear. In the prior patent, #2,315,301, issued March 30, 1943, to John Deans and myself, bearings are provided which take care of the end bearing of one sheave against another, as well as the bearing on the shaft. Bearings of this same character are utilized in the present device, but in addition I provide means whereby the bearings are sealed with respect to the lint and foreign matter, so that the bearing and the shaft may be kept clean.

It is the principal purpose of the present invention to provide a novel sealing means for pulleys of the sheave and tape idler construction whereby adjacent pulleys stacked on a shaft end to end will have bearing surfaces on the shaft and against each other, and the pulleys themselves will provide sealing means to throw out the foreign matter such as lint and keeps it from the bearings.

The nature and advantages of my invention will appear more fully from the following description and accompanying drawings wherein a preferred form of the invention is shown. It should be understood, however, that the drawings and description are illustrative only, and should not be taken as limiting the invention except insofar as it is limited by the claims.

In the drawings:

The figure is a sectional view taken axially of the shaft through a plurality of pulleys or sheaves mounted upon the shaft.

Referring now to the drawing, the construction illustrated is that of a portion of a group of sheaves mounted to turn independently of each other on a common shaft. It will be understood that the number of sheaves or pulleys varies, and the particular exterior shaping or contour of the pulley to adapt it to the usual sheave purposes, or use as a tape idler or as a cam may be varied greatly without affecting the application of my improved seal thereto. The pulleys may be of any suitable material but preferably they are made of a phenolic resin molding material.

The shaft 1 has the bearings 2 thereon. These bearings preferably are of an oil filled material such as that described in my prior patent so that lubrication of the bearing surfaces on the shaft and between the ends of the bearings may be had. The bearings 2 are mounted in the body of the pulleys 3 in such fashion that the pulleys and bearings when stacked face to face on a shaft will be so held that the bearings space the adjacent pulley faces slightly from each other when the bearings are in engagement. As shown in the drawing, the bearings are offset so that they do not extend evenly on both sides of the pulleys. This offsetting however is not necessary, since the bearings may be positioned in line as shown in the prior patent above referred to.

According to my invention I provide the pulleys adjacent to their rims with a laterally extending annular rib 5, and on the opposite side of each pulley I provide an inwardly facing shoulder 6 which overlaps the rib 5 of the adjacent pulley to form a tortuous passage around the rib 5 from the space 7 between the web portion of the pulleys to the exterior atmosphere around the pulley.

In addition to the foregoing construction, each of the pulleys has as a part of its hub an annular rib 8 which extends substantially beyond the rim portion of the pulley in an axial direction. Between the rib 8 and the bearing 2 the hub has an annular channel 9 and a second rib 10, the interior diameter of the rib 10 being somewhat larger than the hub interior diameter, so as to leave a space 11 between the bearing and the rib 10.

On the opposite face of the hub from the ribs 8 and 10 I provide an annular flange 12 which has a recess 13 therein, the recess 13 being aligned with the rib 10 so that the parts 12 and 10 fit together as shown in the drawing. The bearings 2 separate the pulleys sufficiently as shown so that the hubs and rims of adjacent pulleys cannot touch each other. This is important in preventing the material of the pulleys from wearing off and getting into the fabric.

The bearing 2 is of course secured in the hub in the manner described in the prior patent referred to, or in some other suitable manner to securely anchor it in place. When a series of the pulleys are mounted side by side on the shaft the bearings are protected by the tortuous passage around the rib 5 which tends to exclude any foreign material from the space 7 between adjacent pulleys. In addition the seal effected by the ribs 8 and 10 and the cooperating flange 12 provide a secondary barrier where two adjacent pulleys are again overlapped.

When the pulleys are running there is of course air circulation in the space 7 and the tendency is to throw the foreign material radially outward. When the pulleys are stationary the overlapping surfaces that extend axially in the direction of the shaft between the parts 5 and 6 and between the parts 8 and 12 and the parts 10 and 12 catch the foreign material and substantially prevent this foreign material from reaching the bearings.

From the foregoing description it is believed that the nature and advantages of my invention will be clear to those skilled in this art.

Having thus described my invention I claim:

1. In combination a shaft, a first and a second pulley spaced axially on said shaft with confronting side faces, said first pulley having a peripheral flange portion with an annular groove therein on said confronting side face, an annular rib on said second pulley extending into said groove to define a tortuous path between said confronting faces, each of said pulleys having an annular recess in said confronting face defining a chamber below said peripheral tortuous path, and a pair of concentric annular axially extending ribs on the hub portion of said pulleys, the ribs of one pulley being arranged to overlap and extend between the ribs on the other pulley defining a tortuous path at the hub of the pulleys, said peripheral tortuous path and said hub tortuous path being effective to obstruct passage of dirt or the like to the shaft, and said chamber causing dirt to be collected therein and moved by centrifugal force to the outer peripheral portion thereof for movement through said peripheral tortuous path.

2. A pulley assembly comprising a plurality of pulleys, a shaft on which all of said pulleys are separately mounted to turn independently of each other, said pulleys having hubs spaced in axial alignment on said shaft, bearing sleeves in said hubs, each of said pulleys having a continuous annular rib projecting from one said face adjacent the rim portion thereof, an inwardly facing annular shoulder on the opposite side face of each of said pulleys nesting with a corresponding one of said annular ribs of an adjacent pulley, each nested rib and shoulder providing a tortuous clearance space around the entire periphery of adjoining pulleys to exclude foreign material from said bearing sleeves, and means including a tortuous path coacting between the ends of each adjacent pair of pulley hubs to exclude foreign material from said bearing sleeves.

3. A pulley assembly comprising a plurality of pulleys, a shaft on which all of said pulleys are separately mounted to turn independently of each other, said pulleys having hubs spaced in axial alignment on said shaft, bearing sleeves in said hubs, each of said pulleys having a continuous annular rib projecting from one said face adjacent the rim portion thereof, an inwardly facing annular shoulder on the opposite side face of each of said pulleys nesting with a corresponding one of said annular ribs of an adjacent pulley, each nested rib and shoulder providing a tortuous clearance space around the entire periphery of adjoining pulleys to exclude foreign material from said bearing sleeves, each of said pulleys being further provided with an annular medial recess in each side face thereof, the annular recesses in adjoining pulleys together forming a chamber below said tortuous clearance space to collect dirt therein for movement outwardly by centrifugal force through said tortuous clearance spaced upon rotation of said pulleys, and means including a tortuous path coacting between the ends of each adjacent pair of pulley hubs to exclude foreign material from said bearing sleeves.

4. A pulley assembly comprising a plurality of pulleys, a shaft on which all of said pulleys are separately mounted to turn independently of each other, said pulleys each having hubs spaced in axial alignment on said shaft, bearing sleeves in said hubs, each of said pulleys having a continuous annular rib projecting from one side face adjacent the rim portion thereof, and an inwardly facing annular shoulder on the opposite side face of each of said pulleys nesting with a corresponding one of said annular ribs of an adjacent pulley, each nested rib and shoulder providing a tortuous clearance space around the entire periphery of adjoining pulleys to exclude foreign material from said bearing sleeves, each of said pulleys being further provided with an annular medial recess in each side face thereof, the annular recesses in adjoining pulleys together forming a chamber below said tortuous clearance space to collect dirt therein for movement outwardly by centrifugal force through said tortuous clearance space upon rotation of said pulleys, each of said pulleys being further provided with an annular rib on said hub extending laterally beyond the adjacent end face of a corresponding one of said bearing sleeves, each of said pulleys also having on its opposite face at said hub an annular flange provided with a peripheral groove for receiving said last mentioned annular rib on an adjacent pulley, thereby to form an additional dirt barrier inwardly of said dirt chamber and surrounding said bearing sleeves.

CHRISTOPHER VAN DEVENTER, III.

REFERENCES CITED

The following references are of record in the file of this patent:

UNITED STATES PATENTS

| Number | Name | Date |
|---|---|---|
| 464,795 | Dodge | Dec. 8, 1891 |
| 1,668,497 | Fishback | May 1, 1928 |
| 1,800,700 | Patton | Apr. 14, 1931 |
| 2,315,301 | Van Deventer et al. | Mar. 30, 1943 |
| 2,431,446 | Anderson | Nov. 25, 1947 |
| 2,459,290 | Rozner | Jan. 18, 1949 |